Sept. 29, 1959  M. M. MAY  2,906,551
CLAMPING DEVICES
Filed Aug. 4, 1958  2 Sheets-Sheet 1
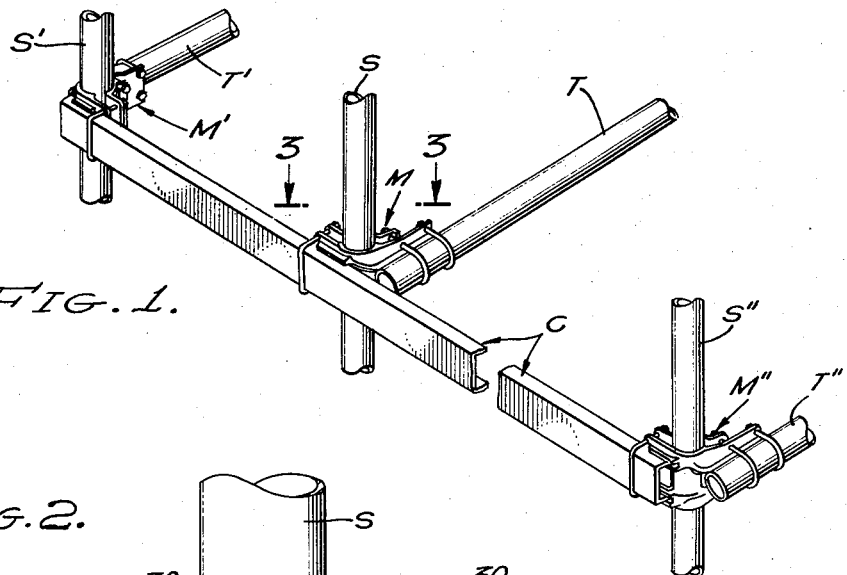
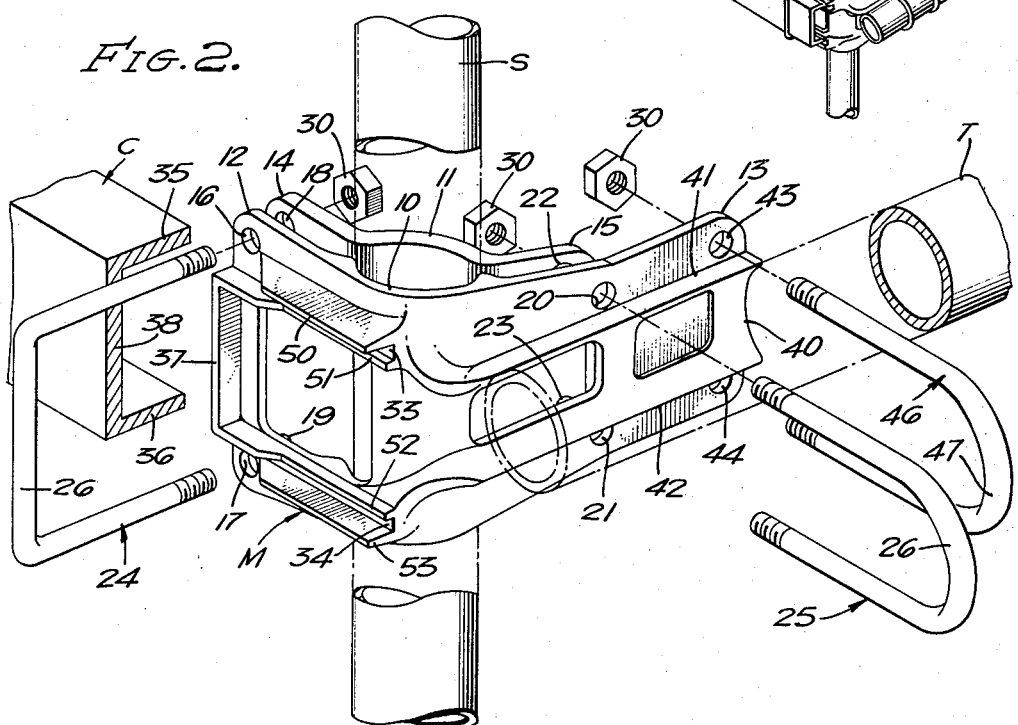
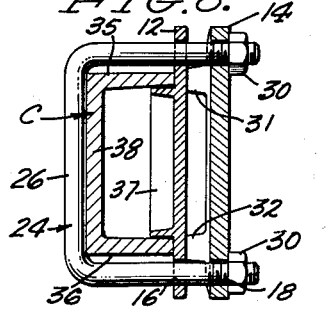
MARVIN M. MAY,
INVENTOR.
HERZIG AND JESSUP,
ATTORNEYS.
BY Albert M. Herzig Sept. 29, 1959  M. M. MAY  2,906,551
CLAMPING DEVICES
Filed Aug. 4, 1958  2 Sheets-Sheet 2
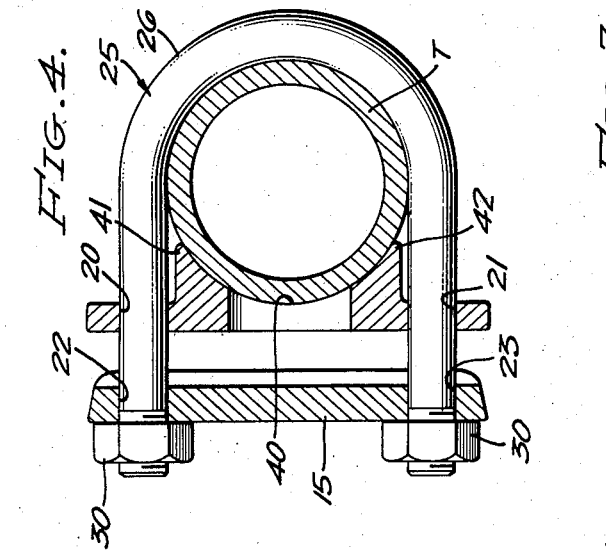
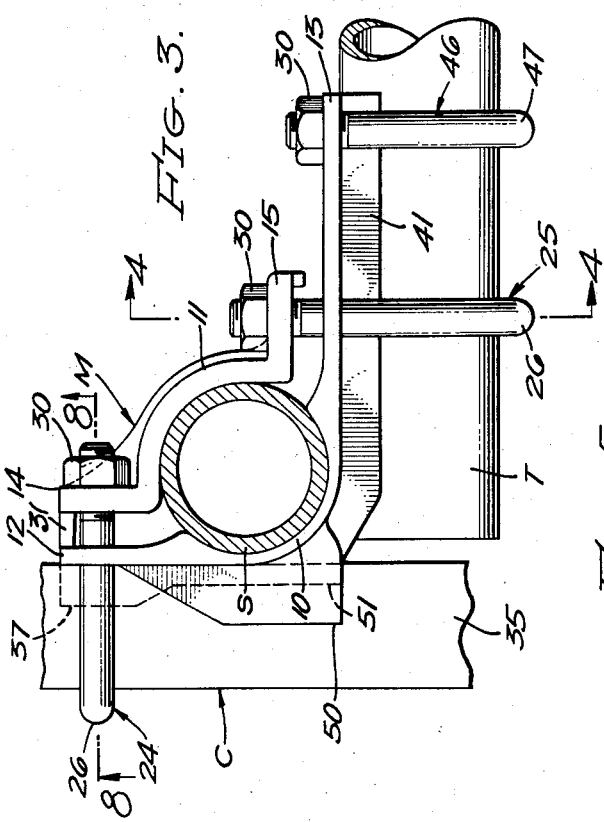
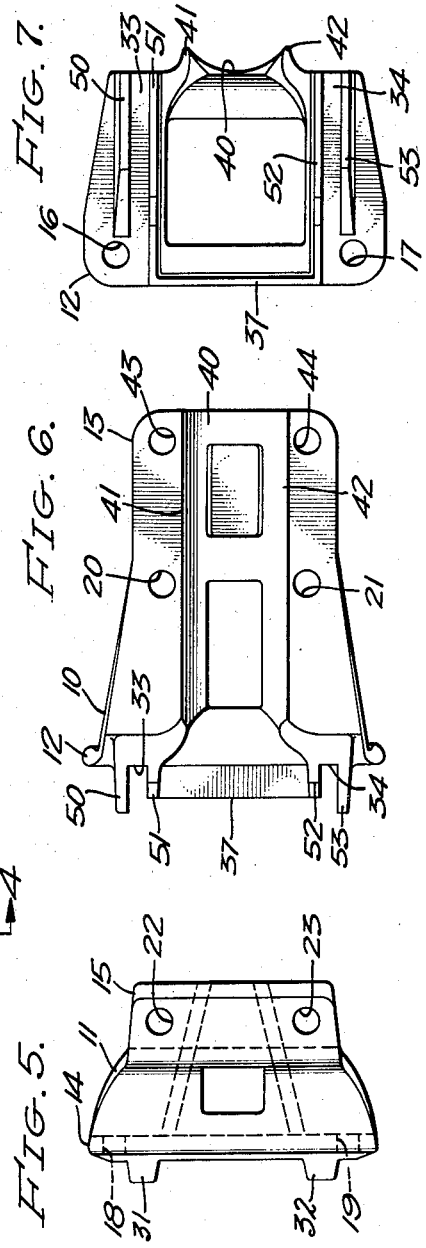
MARVIN M. MAY,
INVENTOR.
HERZIG AND JESSUP,
ATTORNEYS.

United States Patent Office 2,906,551
Patented Sept. 29, 1959

2,906,551

CLAMPING DEVICES

Marvin M. May, Los Angeles, Calif., assignor to Tubular Structures Corp. of America, Los Angeles, Calif., a corporation of California Application August 4, 1958, Serial No. 752,963

2 Claims. (Cl. 287—54)

This invention relates to clamping devices and more particularly to clamping devices adapted for utility in detachably securing horizontal sections to vertical standards in the construction or assembly of demountable storage racks and the like.

The object of the invention is to provide an improved clamping device adapted for utility with tubular vertical standards.

Another object is to provide a clamping device for detachably securing a horizontal channel section to a vertical tubular standard.

Still another object is to provide a clamping device adapted for utility in the construction or assembly of storage racks and the like from tubular sections in detachably securing channel sections to tubular sections.

A further object is to provide an improved rack structure, said structure consisting, at least in part, of horizontal channels sections detachably mounted on vertical tubular standards.

Other objects will be apparent as the invention is more fully hereinafter disclosed.

In the construction of storage racks and the like from tubular sections it is often desirable to provide horizontal channel sections at different horizontal levels in the structure both as a reinforcement member for the structure or for the supporting thereon of flat-surfaced articles of storage such as sheet and strip materials, partition flooring and the like. The present invention provides a clamping device adapted to secure a channel member horizontally to a vertical tubular upright to meet this requirement in such structures. By the term "channel member" as hereinafter used in the specification and claims, I mean to include all equivalent members such as, for example, I-beams, C-beams, flanged beams, and the like members.

One specific embodiment of the improved clamping device of the present invention is illustrated in the accompanying drawings by way of example but not by way of limitation, and will be hereinafter described.

Referring to the drawings:

Fig. 1 is a broken-away perspective view illustrating a portion of a storage rack improved in accordance with the present invention by the mounting thereon of a horizonal channel section between vertical tubular standards by means of the improved clamping device of the present invention;

Fig. 2 is an enlarged exploded view of the improved storage rack illustrating the manner of attachment of the improved clamping means of the present invention to the vertical tubular standard;

Fig. 3 is an enlarged sectional view taken along plane 3—3 of Fig. 1;

Fig. 4 is a sectional view taken along plane 4—4 of Fig. 3;

Fig. 5 is an end view of one of the elements of the clamping device of the present invention;

Fig. 6 is a side view of the other element of the present invention;

Fig. 7 is an end view of the same; and

Fig. 8 is a vertical cross-sectional along line 8—8 of Fig. 3.

The improved clamping device of the present invention, as may be recognized from the drawings from the perspective view of Fig. 1, is one that is adapted to detachably secure a horizontal channel bar or member C to vertical standards S, S' and S" in the construction or assembly of storage racks and the like, in horizontal alignment with tubular sections T, T' and T"; the clamping means of the present invention being indicated in this Fig. 1 by the letters M, M' and M".

Referring to the exploded view of Fig. 2, the means M consists of two cooperating clamping elements each provided with complementary cylindrically curved body sections 10—11, and with complementary right-angled flange extensions 12—13 and 14—15, respectively, thereon, in which flange extensions are provided transversely aligned openings 16, 17, 18, 19, 20, 21 and 22, 23 adapted to permit the passage therethrough of the U-bolts 24—25.

The bight section 26 of the U-bolt 24 is square to adapt the U-bolt to engage the outer surface of the channel member C when located in seated position on the flange 12. The bight section 26 of U-bolt 25 is round to adapt the U-bolt to engage the outer surface of tubular section T when located in seated position on the flange 13.

On the threaded ends of the U-bolts 24—25, nuts 30 are mounted to secure the clamping elements 10—11 together in clamping relation on the standard S. To facilitate clamping engagement of the elements 10—11 to the standard S, the clamping element 11 is provided with spacer flanges 31—32 (see Figs. 3, 4 and 5) adapted to maintain one pair of the flange extensions (13 and 15) in determined spaced relation when the clamping elements 10—11 are secured together in clamping relation on the standard S by the U-bolt and nut means shown.

As indicated in the drawings, the outer surface of flange extension 12 is preferably provided with upper and lower channels or grooves 33—34 formed by and lying between parallel-spaced ribs 50—51 and 52—53, respectively, within which the sides 35—36 of the channel C may be seated and with an upstanding rib or shoulder 37 on the outer end thereof on which the bottom section 38 of a shallow channel C may be seated when in mounted position thereon to brace and reinforce the same.

Also, as indicated in the drawing, the outer surface of flange extension 13 is provided with a cylindrically curved seat 40 between ribs 41—42 adapted to provide a seat for tubular section T when in mounted position thereof. The flange extension 13 is substantially longer than flange extension 12 and is provided with a second pair of transversely aligned openings 43—44 adapted to pass therethrough the threaded ends of U-bolt 46, the bight section 47 thereof being rounded to adapt the U-bolt 40 to engage the outer surface of the tubular section T at a second point in parallel spaced relation to the first point of securement provided by U-bolt 25 when the nuts 30 are secured on the threaded ends thereof.

It is believed obvious that the clamping means M of the present invention is adapted to be utilized either for right-handed or left-handed attachment to the standards S, S' and S" by inverting the means M to form the clamping means M'.

The means M of the present invention is preferably comprised of a cast metal composition such as cast iron, but may be comprised of a plurality of other metal compositions without essential departure from the invention.

Where it is desired to horizontally sustain two channel members C instead of one channel member C and a tubular member T both flange extensions 12 and 13 are formed as indicated for flange extension 12.

Having hereinabove disclosed the present invention generically and specifically and illustrated in the drawings one specific embodiment thereof, it is believed apparent that the invention may be widely modified without essential departure therefrom and all modifications, alterations, changes and departures therefrom are contemplated as may fall within the scope of the following claims:

What is claimed is:

1. A clamp means comprising two cylindrically curved body parts forming opposite segments of a cylinder and adapted to engage a tubular section on opposite sides thereof, flange extensions on opposite sides of each said body part, the flange extensions on each said body part being substantially parallel to the flange extensions on the other body part, spaced flange extensions on one said flange extension adjacent its end adapted to maintain two said flange extensions in determined parallel spaced relationship, upper and lower aligned bolt hole openings through each pair of parallel spaced side extensions, emerging substantially normal from the outer face of one said flange extension, two pairs of parallel ribs on said outer face, each pair forming therebetween a groove for receiving respective sides of a channel bar and U-bolt and nut means for engaging said channel bar and passing through the aligned upper and lower bolt hole openings in said flange extension and its parallel spaced flange extension on the other said body part to secure said channel bar in seated position thereon and the two said flange extensions together in clamping engagement with a tubular section in cooperation with a similar U-bolt and nut means passing through the aligned upper and lower bolt hole openings in the other said pair of parallel spaced flange extensions.

2. Clamp means according to claim 1, including in addition a transverse rib on said outer face extending between the respective said pair of parallel ribs.

References Cited in the file of this patent

UNITED STATES PATENTS

| | | |
|---|---|---|
| 411,432 | Gates | Sept. 24, 1889 |
| 792,065 | Myers | June 13, 1905 |
| 947,811 | Glidden | Feb. 1, 1910 |
| 1,443,818 | Gillespie | Jan. 30, 1923 |
| 2,836,449 | Varlonga | May 27, 1958 |
| 2,847,237 | Ackerman | Aug. 12, 1958 |

FOREIGN PATENTS

| | | |
|---|---|---|
| 69,767 | Netherlands | Mar. 15, 1952 |